US006862952B2

(12) United States Patent
Aeberhard

(10) Patent No.: US 6,862,952 B2
(45) Date of Patent: Mar. 8, 2005

(54) ELECTRIC MACHINING TOOL WITH A PLURALITY OF FUNCTIONAL COMPONENTS IN SEPARATE HOUSINGS

(75) Inventor: Bruno Aeberhard, Studen (CH)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 10/209,131

(22) Filed: Jul. 31, 2002

(65) Prior Publication Data

US 2003/0038480 A1 Feb. 27, 2003

(30) Foreign Application Priority Data

Aug. 24, 2001 (DE) .......................................... 101 41 609

(51) Int. Cl.[7] .......................... F16H 57/02; B25G 3/18; F16B 21/00
(52) U.S. Cl. ........................ 74/606 R; 74/607; 403/326; 81/54
(58) Field of Search .............................. 74/607, 606 R, 74/606 A; 403/326, 329, 293, 291; 81/54, 57.11

(56) References Cited

U.S. PATENT DOCUMENTS

| | | | | |
|---|---|---|---|---|
| 1,966,718 A | * | 7/1934 | Hanson | ........................ 285/313 |
| 3,260,263 A | * | 7/1966 | Bencene et al. | ............. 403/197 |
| 3,347,293 A | * | 10/1967 | Clark | ........................... 81/438 |
| 3,689,114 A | * | 9/1972 | Meserole | ...................... 285/373 |
| 4,329,078 A | * | 5/1982 | Crates et al. | ................ 403/316 |
| 4,589,308 A | * | 5/1986 | Palm | ........................ 81/177.85 |
| 4,791,833 A | | 12/1988 | Sakai | |
| 5,076,120 A | * | 12/1991 | Lin | ................................ 81/54 |
| 5,289,604 A | * | 3/1994 | Kressner | ...................... 15/22.1 |
| 5,322,518 A | * | 6/1994 | Schneider et al. | ........... 604/247 |
| 5,524,333 A | * | 6/1996 | Hogue et al. | .................. 29/593 |
| 5,662,012 A | * | 9/1997 | Grabovac | ..................... 81/483 |

FOREIGN PATENT DOCUMENTS

| | | |
|---|---|---|
| EP | 1 066 930 A2 | 1/2001 |
| GB | 1 316 766 | 5/1973 |

* cited by examiner

Primary Examiner—Thomas R. Hannon
Assistant Examiner—Colby Hansen
(74) Attorney, Agent, or Firm—Michael J. Striker

(57) ABSTRACT

An electric machining tool includes a plurality of functional components in separate housings (1, 2, 3), whereby the individual housings (1, 2, 3) are coupled to one another and axially aligned. A mounting (5) is provided having a spring-elastic belt (6) that surrounds at least partially coaxially an exterior of one of the housings (1, 2, 3). The belt (6) has a plurality of branching gripping arms (7–12) extending in an axial direction, and the ends (13–18) of the gripping arms are engageable in one or more of the housings (1, 3) adjacent to the housing about which the belt (6) extends. The mounting (5) secures the housings (1, 2, 3) against an opposite movement in the axial direction and rotational movement.

5 Claims, 1 Drawing Sheet

ELECTRIC MACHINING TOOL WITH A PLURALITY OF FUNCTIONAL COMPONENTS IN SEPARATE HOUSINGS

BACKGROUND OF THE INVENTION

The present invention relates to an electric machining tool having a plurality of functional components in separate housings, in which the individual housings are axially aligned and connected to one another.

One type of electric machining tool is known from U.S. Pat. No. 4,791,833. According to this patent, an engine housing is coupled to a drive housing of an electric machining tool by a screw connection. Therefore, for assembling of the housing in the electric machining tool, a screwdriver is necessary.

The present invention addresses the underlying problem of providing an electric machining tool of the above-mentioned kind, in which housings that accommodate functional components can be coupled to one another without a tool and in which the housings are tightly held together to avoid the risk of coming apart.

SUMMARY OF THE INVENTION

The above problem is resolved with the present invention, which provides a mounting having a spring-elastic belt that is placeable on the outside of one of the housings and which partially, coaxially surrounds it. From the belt, several gripping arms branch off, extending in an axial direction of the housing and whose ends are engageable with one or more housings adjacent to the housing about which the belt is disposed. With the mounting, which can be mounted without a special tool, the housings are securely connected to one another. This type of mounting is inexpensive to manufacture, and for example, can be punched out of a sheet and subsequently bent.

A first housing is provided, in which drive components are accommodated and which can be coupled to a second housing, in which a gear unit is disposed, and the second housing can be coupled to a further, third housing, in which means for guiding and mounting of a drive shaft is arranged. It is advantageous that with this inventive arrangement, the mounting is placed about the second housing and that the mounting includes gripping arms, which are engageable with the first and/or the third housings.

Advantageously, the housings are connectable to one another via bayonet connecting devices, so that the opposite coupling of the housing can be performed without a tool.

Preferably, the ends of the gripping arms of the mounting or holder are formed as stop or latching hooks and that the housings include latching means, with which the latching hooks can engage.

Furthermore, it is advantageous that the adjacent housing has partially overlapping walls and that in the overlapping walls, slots are provided for engaging the latching hooks. The latching hooks, which are engaged by means of both overlapping walls, operate so that both housings coupled together are secured again an opposite twisting or turning force. In this manner, the housings are not only fixed by the mounting in an axial direction of rotation, but also fixed in the opposite rotational direction.

DETAILED DESCRIPTION OF THE PREFERRED EMBODIMENTS

Figure 1:
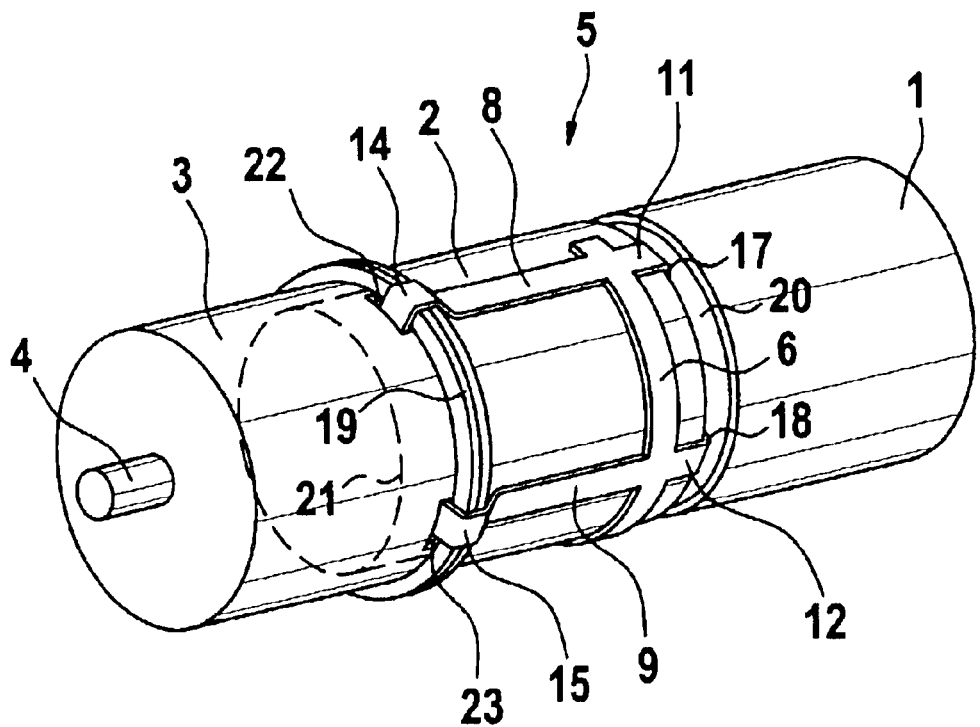
FIG. 1 shows a perspective view of several housings with functional components of an electric machining tool, coupled to one another.

An electric machining tool, for example a screwing or boring machine, typically comprise multiple functional components. These components include a drive unit, for example an electric motor, a one- or multi-stage gear unit, and a unit for mounting and supporting a drive shaft, with which a tool holder, for example, a screw or drill bit, can be rotatably connected. As the schematic illustration in FIG. 1 shows, each of the functional components is accommodated in an individual housing 1, 2, 3. In a first housing 1, the drive unit is disposed; in a second housing 2, connected to the first housing 1, the gear unit is arranged; and in a further, third housing 3 connected to the second housing 2, for example, are disposed a mounting or holding and bearing for a drive shaft 4 of the electric machining tool, a spindle arresting device, or an adjustment mechanism for selecting between screwing, boring, or percussion drilling processes.

The three housings 1, 2, 3 are axially aligned and force- or form-lockingly coupled with one another. A simple coupling of the three housings 1, 2, 3 that requires no tool is realized by using bayonet connection devices. Since bayonet connectors are very well used, they will not be described in detail here and are not explicitly illustrated in the drawings. The housings 1, 2, 3 shown in FIG. 2 have a cylindrical cross section. The invention, however, is not limited to this housing shape. Rather, the present invention can be used with any other housing shape.

Figure 2:
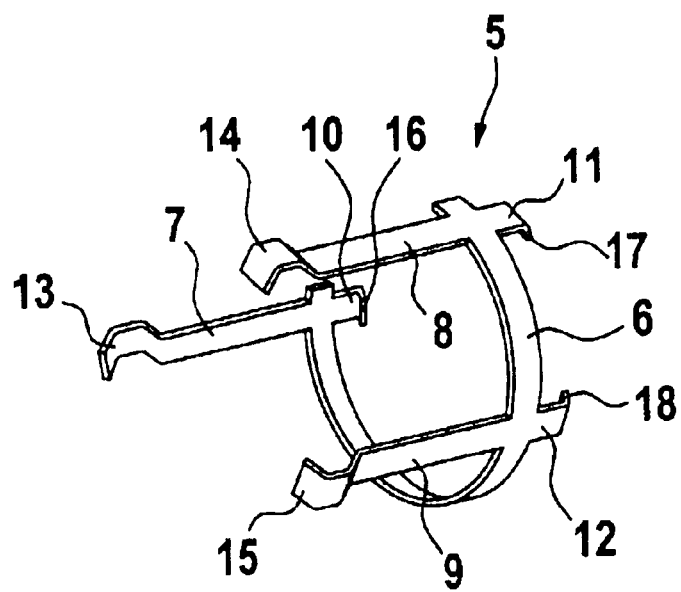
FIG. 2 shows a perspective view of the mounting placeable on the housings.

In order to securely connect the axially coupled housings 1, 2, and 3 to one another, without the use of screws, but for example, with bayonet connectors, so that the housings 1, 2, 3 cannot be removed or loosened, a holder or mounting 5 is provided, which can be placed on the housings 1, 2, 3 without the use of a tool. In FIG. 1, a mounting 5, placed on connected housing 1, 2, 3, is shown. A complete view of this mounting or holder 5 is shown in FIG. 2, which shows a perspective view of this mounting 5 removed from the housings 1, 2, and 3.

The holder or mounting 5 has a spring-elastic belt 6. The belt 6 is so constructed that it can be placed to partially and coaxially surround an exterior of one of the housings. Because the housing 2, about which the belt 6 of the mounting 5 is disposed, has a cylindrical shape, the belt 6 has the shape of a circular arc. The belt 6 does not form a completely closed circle; rather, it is open on one side, so that it can be adjusted transversely on the housing 2. Based on its spring-elastic construction, the belt 6 exhibits a clamping or gripping action on the outer circumference of the housing 2. If the housing 2 about which the mounting 2 is placed should have a different cross section, that is, not circular, then the belt 6 must have a corresponding shape that departs from a circular arc.

Three gripping arms 7, 8, 9 and 10, 11, 12 branch off from the belt in an axial direction to the first housing 1 and to the third housing 3. In the embodiment of the mounting 5 illustrated in the figures, the gripping arms 7, 8, 9 extending in one direction are longer than the gripping arms 10, 11, 12 branching off in the opposite direction. These different lengths of the gripping arms 7, 8, 9 and 10, 11, 12 are not imperative. The length of the gripping arms depends on where on the housing 2 the belt 6 is placed. The gripping arms 7, 8, 9 and 10, 11, 12, in each case, are long enough that they reach the respective adjacent housing 1 or 3.

The ends of the gripping arms 7, 8, 9 and 10, 11, 12 are provided with inwardly extending latching hooks 13, 14, 15 and 16, 17, 18. The latching hooks 13, 14, 15 of the gripping arms 7, 8, 9 extending to the third housing engage a shoulder 19 running in a ring on the third housing 3. The latching hooks 16, 17, 18 of the gripping arms 10, 11, 12 extending to the first housing 1 engage in a groove 20 on the circumference of the first housing 1. Departing from the embodiment represented in the figures, the means for latching the gripping arms 7, 8, 9 and 10, 11, 12 also can be differently formed. By means of the spring-elastic quality of the gripping arms 7, 8, 9, 10, 11, 12 with their latching hooks 13, 14, 15, 16, 17, 18, the mounting 5 applies a tensile force on the first housing 1 and the third housing 3 in the direction on the middle second housing 2, lending to all three housings 1, 2, 3 a secured seating in the axial direction.

In order to ensure against an opposite rotational movement of the housings 1, 2, 3, the walls of adjacent housings partially overlap, as is designated in FIG. 1 with reference numeral 21, and the overlapping wall areas are provided with through-going slots 22, 23, in which the latching hooks 13, 14, 15 of the gripping arms 7, 8, 9 can engage. Because the latching hooks 13, 14, 15 engage through overlapping slots of the overlapping walls 21, they block an opposite turning or twist of the housings 1, 2, 3. In FIG. 1, the turning/twisting guard between the second housing 2 and the third housing 3 is only represented. The turning/twisting guard, however, also can be provided in a similar manner between the first housing 1 and the second housing 2.

In the embodiment shown in FIGS. 1 and 2, the mounting 5 is so constructed that its gripping arms 7, 8, 9 and 10, 11, 12 engage the first housing 1 and the third housing 3. If only two housings are to be fixed to one another by means of the mounting 5, the gripping arms are constructed so that they engage on one side of the housing about which the belt 6 of the mounting 5 extends and, on the other side, they engage the adjacent housing.

It will be understood that each of the elements described above, or two or more together, may also find a useful application in other types of constructions differing from the types described above.

While the invention has been illustrated and described herein as an electric machining tool with a plurality of functional components in separate housings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An electric machining tool, comprising a plurality of functional components in separate housings (1, 2, 3), whereby the housings (1, 2, 3) are coupled to one another and axially aligned, wherein a mounting (5) is provided having a spring-elastic belt (6), said belt (6) being mounted on one of said housings so as to coaxially surround an exterior of one of the housings (1, 2, 3) only partially about its circumference, wherein the belt (6) has a plurality of intergrally branching gripping arms (7–12) extending in an axial direction, and wherein ends (13–18) of said gripping arms are engaged in one or more of said housings (1, 3) adjacent to the housing about which the belt (6) extends.

2. The electric machining tool according to claim 1, wherein a first one of said housings (1) is coupled with a second one of said housings (2), wherein a drive unit is disposed in said first one of said housings (1) and wherein a gear unit is disposed in said second one of said housings (2), wherein the second housing (2) is coupled with a third one of said housings (3), wherein means for guiding and supporting a drive shaft (4) are disposed in said third one of said housings (3), wherein the mounting (5) is placed about the second housing (2), and wherein the gripping arms (7–12) of said mounting (5) are engaged with the first one of said housings (2) and/or the third one of said housings (3).

3. The electric machining tool according to claim 1, wherein the housings (1, 2, 3) are coupled to one another by means or bayonet connection devices.

4. The electric machining tool according to claim 1, wherein the ends of said gripping arms (7–12) are formed as latching hooks (13–18) and wherein the housings (1, 3) have latching means (19, 20, 22, 23) for engaging said latching hooks (13–18).

5. The electric machining tool according to claim 4, wherein adjacent housings (2, 3) have partially overlapping walls (21), and wherein slots (22, 23) are provided in said overlapping walls (21) for engagement of said latching hooks (13, 14).

* * * * *